Patented July 21, 1953

2,646,422

UNITED STATES PATENT OFFICE 2,646,422

CURED CHLOROSULFONATED INTERPOLYMERS OF THE DIOLEFINS

Daniel E. Strain, Wilmington, Del., assignor to E. I. du Pont de Nemours and Company, Wilmington, Del., a corporation of Delaware No Drawing. Application March 16, 1951, Serial No. 216,105

10 Claims. (Cl. 260—79.3)

This invention relates to synthetic elastomers, to a process for their preparation and more particularly to elastomers prepared by curing hydrogenated and chlorosulfonated diolefin polymers.

The curing of elastomers, including natural rubber, buna rubber, chloroprene rubber, polybutadiene and the like, has heretofore been accomplished by the use of sulfurizing agents. An elastomer could be vulcanized if sulfurizable, that is if it contained olefinic unsaturation which would react with the sulfur. These cured products, however, had many disadvantages, particularly with respect to solubility characteristics, oxidation and wear resistance. All of the rubberlike products of compounds containing unsaturation, which have been prepared by means of the sulfurizing reaction, have serious limitations. Natural rubber and the various diene polymers and interpolymers contain olefinic unsaturation both before and after the sulfurizing reaction and/or the curing reaction. The presence of the unsaturated groups is responsible in large measure for the poor aging properties and poor heat resistance of these interpolymers. It is generally known that vulcanized natural rubber, if heated to temperatures above the optimum vulcanization temperature, will degrade or depolymerize to give products of decreasing strength and low softening temperature.

It is an object of this invention to provide cured elastomers which do not have the limitations of the sulfurized and unsaturated elastomers known to the art. Another object of the invention is to provide valuable products from diolefin polymers that contain no olefinic unsaturation. Yet another object is to provide hydrogenated and chlorosulfonated polymers and copolymers of the diolefins that have superior properties. Another object is to provide a process for the hydrogenation, chlorosulfonation and curing of polymers and copolymers of butadiene. Still another object is to provide superior elastomers from chlorosulfonated and hydrogenated compounds that contain hydrogenated unsaturated groups. Other objects and advantages of the invention will hereinafter appear.

In accord with one aspect of the invention, polymers, copolymers and halogenated polymers of the diolefins are subjected to hydrogenation followed by a reaction in which they are treated either simultaneously or successively with chlorine and sulfur dioxide to produce chlorosulfonated hydrocarbon saturated products. Alternatively these polymers may be first chlorosulfonated and thereafter the chlorosulfonated polymer hydrogenated. Products produced by the direct or alternate process may be used as such or compounded and subjected to elevated temperatures and pressures to give a cured elastomer.

In accord with another aspect of the invention, polymers or copolymers of the diolefins are subjected to hydrogenation, followed by a reaction in which they are treated with modifying agents which impart elastomer properties and the property of curability. The elastomer properties may be provided by halogen, hydrocarbon or acyloxy substituent groups while the curing or vulcanizing properties may be provided by sulphonating, phosphonating, carboxylating, chlorosulfonating, chlorocarboxylating and hydrogen sulfide groups. The addition of these groups prior to or subsequent to hydrogenation of the diolefin polymers may be carried out in accord with the process described in the McAlevy et al. Patents 2,416,060 and 2,416,061, wherein this process is described specifically for the treatment of the polymers of ethylene.

The examples illustrate outstanding embodiments of the invention in which parts are by weight unless otherwise indicated.

*Example 1.*—A typical butadiene rubber is prepared by charging an autoclave with 2 parts of sodium stearate, 2 parts of sodium acetate and 1 part of potassium persulfate in water solution together with 100 parts of butadiene. After 50 hours at 50° C. and 5 atmospheres pressure, the latex is removed, precipitated with acid and washed several times to free the coagulum of residual inorganic salts and soap.

After the rubbery mass is dried, it is dissolved in decahydronaphthalene and placed in an autoclave. A nickel catalyst is added and the vessel heated to 250° C. Hydrogen is pressured in to maintain a pressure of 1000 p. s. i., and the reaction allowed to proceed for about 5 hours. The material obtained is more tacky than the original polymer but is still elastic.

The hydrogenated product (75 parts) is dissolved in carbon tetrachloride (2500 parts) at 77° C. Into this solution gaseous chlorine and sulfur dioxide are introduced at the rate of 25 g./hr. and 50 g./hr., respectively, for about 5 hours under irradiation from a type $H_4$ 100-watt mercury vapor lamp. The product is isolated through the addition of acetone and methanol to the synthesis mixture and filtration of the precipitated solid, and a rubbery polymer obtained which had considerable cold flow.

The tough, rubbery product containing 21% Cl and 2% S is banded on a rubber mill to remove last traces of solvent, then compounding and vulcanizing agents are added. This material is cured by compounding with 1 part Captax (mercaptobenzothiazole) 10 parts wood rosin and 40 parts of litharge, followed by heating in a mold for 90 minutes at 135° C. under pressure. The vulcanizate is strong, tough and elastic.

Example 2.—A high molecular weight copolymer is prepared by bringing 160 parts of isobutylene and 40 parts of butadiene together in 100 parts of chloroform containing 2 parts of anhydrous aluminum chloride at −76° C. When the reaction is over, most of the solvent is removed under vacuum, the crude polymer is then washed several times with water to remove residual catalyst and dried 16 hours in a vacuum desiccator.

Hydrogenation of the polymer is effected in toluene solution using a molybdenum sulfide catalyst. Some inconsequential degradation occurs but 80% of high molecular weight material remains after 8 hours at 200° C. and 5000 p. s. i. The catalyst is filtered off, and the solvent and low molecular weight products removed.

The residue (100 parts) is taken up in carbon tetrachloride (3000 parts) at reflux temperature. Sulfur dioxide and chlorine are bubbled into the solution as in Example 1, the carbon tetrachloride containing 2 parts of alpha,alpha'-azobis-isobutyronitrile in solution. The material isolated by steam distillation of the solvent contains 19% chlorine and 1% sulfur. Calcium acetate (15 parts), methyl "Tuads" (tetramethyl thiuram disulfide), (2 parts), wood rosin (5 parts) and clay (50 parts) are added stepwise to 100 parts of the chloro-sulfonated product on a 6-inch rubber mill. The stock processes easily on a rubber mill and when milled out in a 70 mil sheet, and cured at 150° C. in a hydraulic press for 30 minutes, gives a vulcanizate having an excellent strength and elongation.

Example 3.—Butadiene (50 parts) and n-butyl methacrylate (50 parts) are emulsified with 5 parts of soap in 180 parts of distilled water to which 0.3 part of $K_2S_2O_8$ and 0.3 part of tert-dodecylmercaptan (from triisobutylene and $H_2S$) are added. The mixture is heated at 125° F. with agitation for 15 hours, after which the latex is precipitated with ethanol. After several washings the elastomer is dried, dissolved in benzene and placed in an autoclave with copper oxide-zinc oxide catalyst. Hydrogenation is conducted at 300° C. under 200 atmospheres pressure. The rubbery product is isolated by adding the solution slowly to boiling water and causing the solvent to flash off.

The reaction product (25 parts) is dissolved in hot carbon tetrachloride (300 parts) and the catalyst filtered off. The solution is then irradiated by a 300-watt tungsten filament lamp while being maintained at 77° C. Gaseous chlorine and sulfur dioxide at the rate of 25 pts./hr. and 50 pts./hr. are introduced with stirring over a two-hour period, and the crude resin isolated by steam distillation of the solvent. The finely divided, spongy material is dried by banding it on a rubber mill for half an hour at 150° F. On analysis it contains 19% chlorine and 3% sulfur. On compounding 100 parts of this rubbery resin with 50 parts of channel black, 3 parts of a hydrogenated wood rosin and 2 parts of "Tetrone" A (dipentamethylene thiuram tetrasulfide), and curing at 155° C. for 60 minutes in a press, a tough vulcanizate is obtained. When methyl or ethyl methacrylate is copolymerized with butadiene, hydrogenated and chlorosulfonated in a manner similar to the above, stiffer, logier products are obtained which can be vulcanized by use of the above formula and procedure.

Example 4.—A solution containing 25 parts of a 1 : 1 copolymer of butadiene and vinyl chloride (molecular weight about 20,000) which had been hydrogenated under pressure in 300 parts of carbon tetrachloride at 77° C., is treated with sulfur dioxide and chlorine under radiation from a 300-watt tungsten filament lamp, and in the presence of acetyl peroxide (1 part). The product is precipitated by the addition of acetone and methanol to the solution. After drying in a vacuum oven it contains 45% chlorine and 2% sulfur. One hundred parts of the chlorosulfonated polymer is compounded on a rubber mill with 80 parts of calcium carbonate, 3 parts of wood rosin, 10 parts of thiourea and 1 part of benzothiazyl disulfide. The resulting stock is sheeted out to a 10 mil film on a three roll calender, and the sheet cured in an oven 3 hours at 130° C. The film is tough and elastic, resembling natural rubber.

Example 5.—Chloroprene and butadiene are copolymerized in an emulsion system using an alkyl benzene sulfonic acid emulsifying agent and potassium persulfate catalyst. The isolated product, which contained 21.5% chlorine, is subjected to hydrogenation in the presence of nickel at 200° C. and 400 p. s. i. After the solvent and catalyst are removed, 50 parts of the rubbery polymer are dissolved in 400 parts of carbon tetrachloride at reflux temperature. Under the radiation of actinic light, sulfur dioxide and chlorine are introduced to the solution. A product containing 35% chlorine and 1% sulfur is isolated by volatilizing the solvent with steam. When 100 parts of this chlorosulfonated product is compounded with 20 parts of magnesia, 60 parts of "Silene E. F." (hydrated calcium silicate), 2 parts of wood rosin and 1.5 parts of "Captax" and the compound subsequently cured under pressure at 140° C. for 90 minutes, a tough strong vulcanizate is obtained.

Example 6.—Isoprene and styrene are copolymerized according to the method of Wollthan and Becker (U. S. P. 2,281,613), and the product hydrogenated according to Graves (U. S. P. 2,046,160). In carbon tetrachloride (300 parts) containing 2 parts of acetyl peroxide, 25 parts of the elastomer is dissolved, sulfur dioxide and chlorine at the rate of 3 parts/hr. and 6 parts/hr. respectively, being introduced for 4 hours. Then the solvent is removed under vacuum, and the chloro-sulfonated polymer (16.2% Cl and 1.2% S) is banded on a rubber mill to remove the last traces of the carbon tetrachloride. To the elastomer (100 parts) is added 2 parts of p-quinone dioxime, 20 parts alumina, 5 parts wood rosin and 40 parts of silica gel. The compound is cured 15 minutes at 160° C. in a vulcanizing press, giving a tough, elastic vulcanizate. Acrylonitrile, vinyl isobutyl ether and vinyl acetate also copolymerize with isoprene to give similar products on hydrogenation and chlorosulfonation.

The invention contemplates the preparation of synthetic elastomers from compounds containing conjugated unsaturated groups. Examples of such compounds are butadiene; 1,4-dimethyl butadiene; 1,1-dimethyl butadiene; 1-vinyl butadiene; chloroprene; cyanoprene; and cyclopentadiene; and equivalents as well as the halogenated unsaturated derivatives of these compounds and their equivalents. Other compounds that may be reacted in accord with the process of this invention include copolymers of the above described polymerizable compounds and equivalents with aromatic hydrocarbons, e. g. toluene, xylene, etc.; isobutylene; the acrylates and methacrylates such, for example, as the methyl, ethyl, normal and isopropyl, normal and isobutyl and higher alkyl esters of acrylic and methacrylic acids; vinyl acetate; allyl acetate; vinyl chloride; vinyl pyridine; vinyl carbazole; vinylidene chloride; styrene; chloroprene; acrylonitrile; vinyl-isobutyl ether; ethylene; propylene and the higher olefins; and acrolein.

The polymers and copolymers hereinafter generically called polymers, described in the last paragraph, may be formed by any well known polymerization process. The resulting polymers, some of which are known in the art to have elastomer properties, all contain unsaturated groups that have not been saturated during the polymerization reaction. By a second step of the process the polymers, with their unsaturated groups, are subjected to a reaction wherein the unsaturated groups are saturated with hydrogen to give a substantially fully saturated polymer. Any suitable hydrogenation reaction may be used, such, for example, as one in which a solution of the polymer is made in an inert solvent, a hydrogenation catalyst such as a zinc chromite, copper chromite, or the well known nickel or cobalt catalyst added and the solution subjected to a hydrogen pressure between 100 and 1500 lbs./sq. in. under a temperature between 100 and 300° C.

The hydrogenated polymer, now substantially fully saturated, is subjected to a reaction with chlorine and sulfur dioxide. This reaction is preferably conducted by dissolving the hydrogenated polymer, preferably after isolating it from the crude hydrogenation reaction mixture, in a solvent which is inert, to chlorine or sulfur dioxide such as carbon tetrachloride or the halogenated hydrocarbons generally, such as tetrachloroethylene, dichlorodifluoroethylene, etc. The resulting polymer-containing solution is then treated with chlorine and sulfur dioxide, either simultaneously or successively, at a temperature between 30 and 150° C. under atmospheric or superatmospheric pressures and in the presence of a suitable catalyst such as actinic light, benzoyl peroxide, an azo catalyst such as that described in the Hunt patent, U. S. 2,471,959, issued May 31, 1949, or other suitable chlorosulfonation catalyst. Alternatively, the hydrogenated polymer may be treated with phosgene, $POCl_3$ and $Cl_2$ and the other reactants referred to in the McAlevy et al. patents to give the substituents referred to.

The chlorosulfonation is conducted for optimum properties of the final elastomer until the ratio of substituent chlorine atoms to carbon atoms in the polymer chain is in a range between 1 : 4 and 1 : 8. More broadly speaking and on a percentage by weight basis, chlorine content of the polymer should range between 20 and 45%. The sulfur content is likewise critical and should range between approximately 0.25 and 3% by weight on the above basis. When the sulfur content is less than about 0.25 a considerable portion of the product is uncurable; the cured elastomer lacks snap, is partially soluble in organic solvents and otherwise displays the behavior of non-vulcanized elastomers.

The unsaturated compound which has been polymerized, the resulting polymer hydrogenated and the hydrogenated polymer chlorosulfonated, is now ready for the final curing operation. This operation is best conducted by compounding the hydrogenated and chlorosulfonated polymer with a vulcanization mixture containing an oxide of a polyvalent metal and/or other curing aids hereinafter described, followed by subjecting the mixture to suitable heat and pressure. The heating is applied in a hydraulic press, an open oven or steam chamber under pressure. Mixing is carried out on a rubber mill or alternatively, in a Banbury mixer.

The metal oxide preferred for use in the vulcanization mix is litharge, although good results are also obtained with magnesia, zinc oxide, red lead and barium oxide and other polyvalent metal oxides, particularly divalent metal oxides. Equivalents of the oxides in this invention are the hydroxides, and the salts thereof with weak acids such as zinc stearate, lead abietate, magnesium adipate and calcium carbonate. Of these salts, the lead and zinc salts of high molecular weight weak acids, particularly naphthenic, abietic and stearic, are most suitable. In addition to the metal oxide, the vulcanization mix may contain a weak monobasic or polybasic acid of high molecular weight, such as stearic acid or rosin. Small amounts of antioxidants and/or accelerators may also be used, such as diphenyl guanidine, mercaptobenzothiazole, tetramethyl thiuramdisulfide, phenyl beta-naphthyl amine, or high molecular weight phenolic compounds. Fillers or re-enforcing agents such as carbon black, barium sulfate, kaolin, diatomaceous earth, powdered talc, titanium dioxide, and calcium sulfate may be used. Sulfur may also be included in the vulcanization mix, but it is generally omitted since the vulcanization reaction takes place readily in the absence of free sulfur. The quantities of these agents which give best results are, per 100 parts of substituted and hydrogenated polymer: oxide of di- or polyvalent metal, 2 to 60 parts, preferably 10 to 20 parts and with litharge especially 30 to 60 parts; rosin, or equivalent, 0 to 30 parts, preferably 2 to 10 parts; antioxidant, 0.0 to 3.0 parts, preferably 0.5 to 2.0 parts; accelerator, 0 to 8 parts, preferably 1 to 5 parts; inorganic fillers, organic fillers or re-enforcing agents 0 to 500 parts, preferably 0 to 30 parts.

Other curing agents may be employed (and in substantially the same amounts) such, for example, as powdered charcoal and other forms of pulverulent carbon; thiourea; adipamide; phthalamide; adiponitrile; 2 - mercaptoimidazoline; hexamethylene tetramine; ammonium thiocyanate; Dyphos ($2PbO-HPbPO_3.\frac{1}{2}H_2O$); ethylenediamine; monoethanolamine; p-quinone dioxime as well as other polyhydroxy, polymercapto, polyamino and polyamido compounds.

The hydrogenated and chlorosulfonated polymers are compounded preparatory to curing by mixing them with the desired amounts of compounding ingredients on a rubber mill or in some other suitable mixing apparatus and are preferably compounded at room temperature, although temperatures higher than room temperature may be employed. The compounded product is then cured by heating at a temperature between 75° and 175° C. for a period in the order of 10 to 120 minutes under a pressure of from 15 to 2500 lbs./sq. inch. Shaped articles can be formed by curing the compounded mixture in a heated mold under pressure.

The products of this invention vary from soft elastomeric materials to hard horny substances, resembling hard rubber and since they can be prepared in many shapes for molding, they are useful in a number of fields where pliability, solvent resistance, non-thermo plasticity, rubber properties and other attributes make them applicable. Those skilled in the art of elastomer uses will appreciate the wide adaptability of these polymers in the art.

I claim:

1. A synthetic elastomer comprising a hydrogenated and chlorosulfonated polymer of the group consisting of conjugated diolefin polymers and halogenated products thereof, the order of processes used in producing the elastomer being hydrogenation followed by chlorosulfonation, the chlorosulfonation reaction being conducted until the product contains on a weight basis 20 to 45% chlorine and 0.25 to 3.0% sulfur.

2. A synthetic elastomer comprising a hydrogenated and chlorosulfonated conjugated diolefin polymer, the order of processes used in producing the elastomer being hydrogenation followed by chlorosulfonation, the chlorosulfonation reaction being conducted until the product contains on a weight basis 20 to 45% chlorine and 0.25 to 3.0% sulfur.

3. A synthetic elastomer comprising a hydrogenated and chlorosulfonated conjugated diolefin copolymer, the order of processes used in producing the elastomer being hydrogenation followed by chlorosulfonation, the chlorosulfonation reaction being conducted until the product contains on a weight basis 20 to 45% chlorine and 0.25 to 3.0% sulfur.

4. A synthetic elastomer comprising a vulcanized hydrogenated and chlorosulfonated conjugated diolefin polymer, the order of processes used in producing the elastomer being hydrogenation followed by chlorosulfonation, the chlorosulfonation reaction being conducted until the product contains on a weight basis 20 to 45% chlorine and 0.25 to 3.0% sulfur.

5. A synthetic elastomer comprising a vulcanized hydrogenated and chlorosulfonated conjugated diolefin copolymer, the order of processes used in producing the elastomer being hydrogenation followed by chlorosulfonation, the chlorosulfonation reaction being conducted until the product contains on a weight basis 20 to 45% chlorine and 0.25 to 3.0% sulfur.

6. A synthetic elastomer comprising a hydrogenated and chlorosulfonated butadiene copolymer, the order of processes used in producing the elastomer being hydrogenation followed by chlorosulfonation, the chlorosulfonation reaction being conducted until the product contains on a weight basis 20 to 45% chlorine and 0.25 to 3.0% sulfur.

7. A synthetic elastomer comprising a vulcanized hydrogenated and chlorosulfonated butadiene polymer, the order of processes used in producing the elastomer being hydrogenation followed by chlorosulfonation, the chlorosulfonation reaction being conducted until the product contains on a weight basis 20 to 45% chlorine and 0.25 to 3.0% sulfur.

8. A synthetic elastomer comprising a vulcanized hydrogenated and chlorosulfonated polymer of the group consisting of conjugated diolefin polymers and halogenated products thereof, the hydrogenated and chlorosulfonated polymer containing on a weight basis 20 to 45% chlorine and 0.25% to 3.0% sulfur.

9. A synthetic elastomer comprising a hydrogenated and chlorosulfonated butadiene polymer, the hydrogenated and chlorosulfonated polymer containing on a weight basis 20 to 45% chlorine and 0.25% to 3.0% sulfur.

10. A synthetic elastomer comprising a vulcanized hydrogenated and chlorosulfonated butadiene copolymer, the hydrogenated and chlorosulfonated copolymer containing on a weight basis 20 to 45% chlorine and 0.25% to 3.0% sulfur.

DANIEL E. STRAIN.

No references cited.